United States Patent [19]

Graber

[11] 4,250,772
[45] Feb. 17, 1981

[54] METHOD AND APPARATUS FOR STRIPPING INSULATED ELECTRIC CONDUCTORS

[75] Inventor: Alfred Graber, Attenschwiller, France

[73] Assignee: Societe Electrique Sterling, Saint-Louis, France

[21] Appl. No.: 60,164

[22] Filed: Jul. 24, 1979

[30] Foreign Application Priority Data

Jul. 31, 1978 [FR] France .................. 78 22638

[51] Int. Cl.³ .............................................. H02G 1/12
[52] U.S. Cl. ............................................. 81/9.51
[58] Field of Search ................................. 81/9.51

[56] References Cited

U.S. PATENT DOCUMENTS

| | | | |
|---|---|---|---|
| 3,292,462 | 12/1966 | Turecek et al. | 81/9.51 |
| 3,368,428 | 2/1968 | Gudmestad | 81/9.51 |
| 3,527,124 | 9/1970 | Ullman | 81/9.51 |
| 3,638,518 | 2/1972 | Parker | 81/9.51 |
| 3,810,289 | 5/1974 | Hannabery | 81/9.51 X |
| 3,892,145 | 7/1975 | Richie | 81/9.51 |
| 4,084,310 | 4/1978 | Dragisic | 81/9.51 X |

Primary Examiner—James G. Smith
Attorney, Agent, or Firm—Cushman, Darby & Cushman

[57] ABSTRACT

A method for stripping electric wires is disclosed, which comprises the steps of introducing the end of the wire within a passage defined by the facing cutting edges of two knives adapted for movement in a substantially radial direction in the plane of the passage between an introduction position, wherein the minimum radial spacing between the edges is greater than the outer diameter of the insulating sheath, and a cutting position, wherein said minimum radial spacing is substantially equal to the inner diameter of the insulating sheath, applying clamping means onto the wire portion the insulating sheath of which is to be preserved, bringing the knives in cutting position, bringing radially the knives in an intermediate withdrawing position, wherein the minimum radial spacing between the edges is greater than the inner diameter of the insulating sheath, but smaller than the inner diameter thereof, and spacing relatively to each other and in a direction perpendicular to the plane of said passage the knives and clamping means applied onto the wire portion for longitudinally removing the sheath portion which is maintained by the knife edges.

12 Claims, 4 Drawing Figures

METHOD AND APPARATUS FOR STRIPPING INSULATED ELECTRIC CONDUCTORS

FIELD OF THE INVENTION

The present invention relates to a process and apparatus for stripping or unsheathing electric wires and cables.

DESCRIPTION OF THE PRIOR ART

Methods for stripping an electric cable which is constituted by a conductor covered by an insulating sheath, or for unsheathing an electric cable which is constituted by a plurality of electric wires included within one insulating sheath, have been known heretofore and they usually comprise the following steps:

introducing the end of the wire or of the cable within a passage defined by sharp cutting edges of two knives, said knives being movable substantially radially in the plane of the passage between an introduction position, wherein the minimum radial spacing between the edges of the knives is greater than the outer diameter of the insulating sheath, and a cutting position, wherein said minimum radial spacing is substantially equal to the inner diameter of the insulating sheath, said knives being then in their introduction position;

applying clamping means onto a portion of the wire or of the cable near the knives, the insulating sheath of which is to be maintained;

bringing the knives into said cutting position; and separating from each other in a direction perpendicular to the plane of the passage the knives and the clamping means applied onto said wire or cable portion for axially moving the insulating sheath portion retained by the knife edges.

Such methods laid to a risk of damaging the conductor of the thus stripped wire, or the wires of the thus unsheathed cable, through the edges of the cutting knives during the step of removing the insulating sheath.

In view to obviate this difficulty, it has been proposed to set the minimum radial spacing between the knife edges in the cutting position in such a manner that it is a little greater than the inner diameter of the insulating sheath to be removed. In this way, the above mentioned risks are suppressed, but nevertheless, this causes another disadvantage to appear. As a matter of fact, the insulating sheath being not completely cut, its removal requires an important stripping effort for tearing away the sheath section which has not been cut. This also results in an irregular aspect of the cutting line of the insulating sheath, and this method cannot be used for unsheathing cables having flexible sheath, such as a rubber sheath, the elasticity of which prevents the breaking of the sheath sections which have not been cut. Similarly this method cannot be employed for unsheathing cables the sheath of which comprises an inner screen layer of metallic wires, surrounded by an insulating envelope. In this case, it is indeed necessary to cut not only the insulating envelope, but also the screen layer, for removing the whole sheath.

SUMMARY OF THE INVENTION

It is therefore an object of the present invention to provide a novel and improved method for stripping and unsheathing electric wires or cables which preserves the advantages of the above mentioned methods, while overcoming the aforementioned drawbacks.

It is another object of the present invention to provide an apparatus for carrying out this method.

These objects, such as other objects which will appear along the following description, are achieved according to the present invention by providing a method for stripping electric wires and cables which includes, after the above mentioned step of bringing the knives into cutting position and before the step of separating from each other the knives and the cutting means, a further step of displacing radially the knives to an intermediate withdrawing position wherein the minimum radial spacing between the knife edges is greater than the inner diameter of the sheath, but smaller than its outer diameter.

The present invention also provides for the realization of an apparatus for stripping an electric wire constituted by a conductor covered by an insulating sheath or an electric cable constituted by a plurality of electric wires included within a common insulating sheath, said apparatus comprising:

two movable knives, the edges of which define therebetween a passage for the wire or the cable, said knives being adapted to be moved radially to this passage between an introduction position wherein the minimum radial spacing between the cutting edges is greater than the outer diameter of the insulating sheath and a cutting position wherein said minimum radial spacing is substantially equal to the inner diameter of the insulating sheath;

clamping means arranged in prolongation of said passage and designed for receiving a portion of wire or cable the insulating sheath of which is to be retained;

means for driving the movable knives between the introduction position and the cutting position; and means for applying the clamping means onto the wire portion they receive and for moving them longitudinally in a direction perpendicular to the passage plane, for respectively separating and bringing together the clamping means and the knives;

said apparatus further comprising means for bringing and maintaining the knives in an intermediate withdrawing position, wherein the minimum radial spacing between the knife edges is greater than the inner diameter of the insulating sheath, but smaller than the outer diameter thereof during at least the initial step of relative spacing displacement of the clamping means and the knives.

BRIEF DESCRIPTION OF THE DRAWINGS

Further objects and advantages of the present invention will become apparent upon reading the following detailed description of the preferred embodiments with reference to the accompanying drawings in which.

DETAILED DESCRIPTION OF THE DRAWINGS

Figure 1:
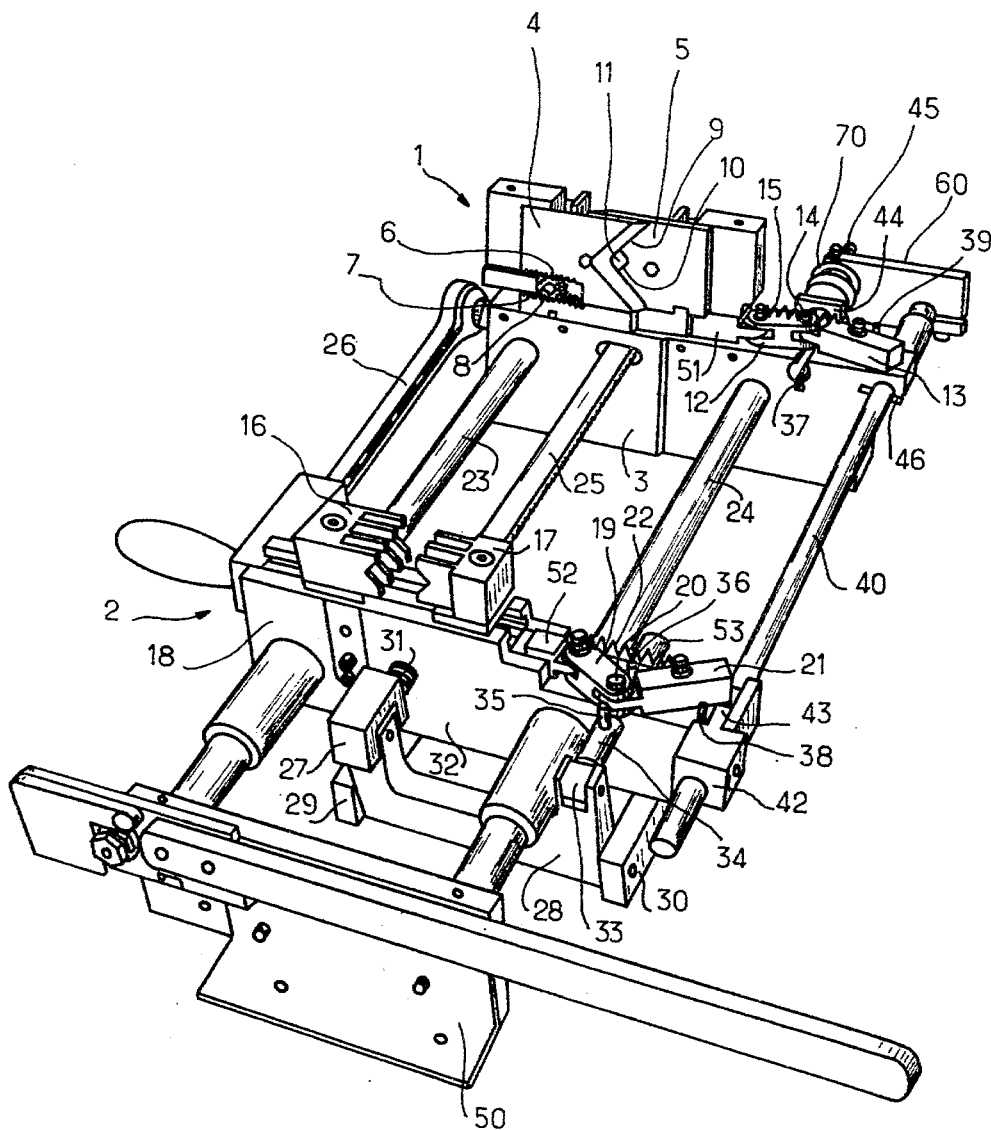
FIG. 1 is a perspective view of the stripping apparatus according to the invention, the knives being shown in withdrawing position.

FIG. 1 is a perspective view of a preferred embodiment of the stripping apparatus according to the present invention. Said apparatus essentially comprises a stationary cutting unit designated generally by reference 1, and a clamping unit designated generally by reference 2, mounted for sliding movement between the cutting unit 1 and a mounting base 50. The general structure of these elements is well known in the art, and will therefore be briefly described, whereas the special means provided for actuating the cutting unit 1 and the clamping unit 2 according to the method of the present invention will be more detailed.

The cutting unit 1 comprises a knife support 3, which is rigidly mounted for example on a working surface (not shown), and on which are movably mounted knives 4 and 5 by means of racks 6 and 7 engaging an inverting pinion, in view to achieve opposite relative sliding movements of said knives 4 and 5. The knife 4 is provided with a rack 6 which engages, through the inverting pinion 8, the rack 7 provide on the knife-bearing slider 51 onto which the knife 5 is mounted. Edges 9 and 10 define therebetween a passage 11, extending substantially in a vertical plane, the radial dimensions of which vary according to the relative position of the knives 4 and 5. The sliding movement of the knife 5 on the knife support 3 is achieved through a knuckle joint assembly which comprises a connecting rod 12 rotatably linked on one hand to the knife bearing slider 51 and on the other hand to a swivel 13 which is in turn rotatably mounted on the knife support 3. It will be readily understood that the longitudinal movement, i.e. perpendicularly to the plane of the passage 11, of the knuckle 14 between the connecting rod 12 and the swivel 13 causes the knife 5 to slide, which in turn causes the knife 4 to slide in the reverse direction, but of a same incremental sliding displacement. A spring 15 is stretched between the swivel 13 and the connecting rod 12 and helps to maintain said elements in a relative angular offset position.

The clamping unit 2 similarly comprises clamping jaws 16 and 17, disposed in the longitudinally prolongation of passage 11, and mounted for inverted sliding movements on a carriage 18 by means of a reversing pinion assembly (not shown). The clamping jaw 17 is slidingly actuated, such as the knife 5, by means of a knuckle device comprising a connecting rod 19 which is linked on one hand to a slider 52 integral with the jaw 17 and on the other hand to a swivel 21 rotatably mounted on the carriage 18 by means of a knuckle 20. The connecting rod 19 and the swivel 21 are urged into a relative offset angular position by a spring 22, and knuckle 20 lays in the longitudinal prolongation of knuckle 14. Moreover, the carriage 18 is slidingly mounted on two parallel rods 23 and 24 rigidly mounted on one hand to the knife support 3 and on the other hand to the mounting support 50.

According to the present invention, specific means are provided for ensuring the longitudinal displacement of the clamping unit 2 relatively to the cutting unit 1, and the radial displacement of knives 4 and 5 and of clamping jaws 16 and 17, in order to carry out the above mentioned method.

The displacement in the longitudinal direction of the clamping unit 2 is realized through a rack 25, in meshing engagement with a pinion mounted on the knife support 3 and actuated by a crank 26. The rack 25 freely passes through the carriage 18 and has its end protruding from the face 32 of the carriage 18 opposite to the cutting unit 1 provided with a guiding fork 27 in which is received the end of a first arm of a U-shaped stirrup or calliper 28, which is supported for rotation about the longitudinal axis of the base of the U-shaped stirrup, between two parallelly extending cross bars 29 and 30 which are rigidly mounted on the carriage 18. A spring 31 is compressed between the guiding fork 27 and the face 32 of carriage 18 and urges the ends of the arms of the stirrup 28 so as to push same away from the face 32. The second arm of the stirrup 28 is provided with a roller 33 bearing against an actuating rod 34 which is received within a bore of carriage 18 for sliding movement in a longitudinal direction and which is provided with two actuating pins 35 and 36 extending parallel to the knuckles 20 and 14, respectively, of both connecting rod - lever units which actuate the clamping jaws 16 and 17 and the cutting knives 4 and 5. A bore 37 is provided through the knife support 3, in prolongation of the actuating rod 34 for receiving the end thereof 53 protruding from the carriage 18 which is opposite to the end of the rod against which the roller 33 is bearing. A stop pin 38 rigidly mounted on the carriage 18 limits the closed position of the clamping jaws, whereas a stop pin 39 rigidly mounted on the knife support 3 limits the opening of the knife. An adjustable stop 44 limits the motion of the knuckle 14 in the direction opposite to the clamping unit 2.

The apparatus according to the invention further comprises a longitudinal control rod 40, mounted so as to extend parallel to the sliding direction of the clamping unit 2, and having one end projecting from the knife support 3 wherein it is slidingly received, which supports a rod 45 extending longitudinally in the prolongation of the path of the knuckle 14 and is linked to the control rod 40 by means of an arm 60. The other end of the control rod 40 supports a restraining block 42, the position of which on the control rod 40 is adjustable and which is provided with a protruding portion 43 against which the free end of the lever 21 may abut. A stop pin 46 rigidly mounted on the control rod 40 adjacent the knife support limits the motion of the restraining block 42 to urge the cutting unit 1. Preferably, a spring 70, compressed between the arm 60 and the adjustable stop 44, urges the stop pin 46 against the knife support 3.

Figure 2:
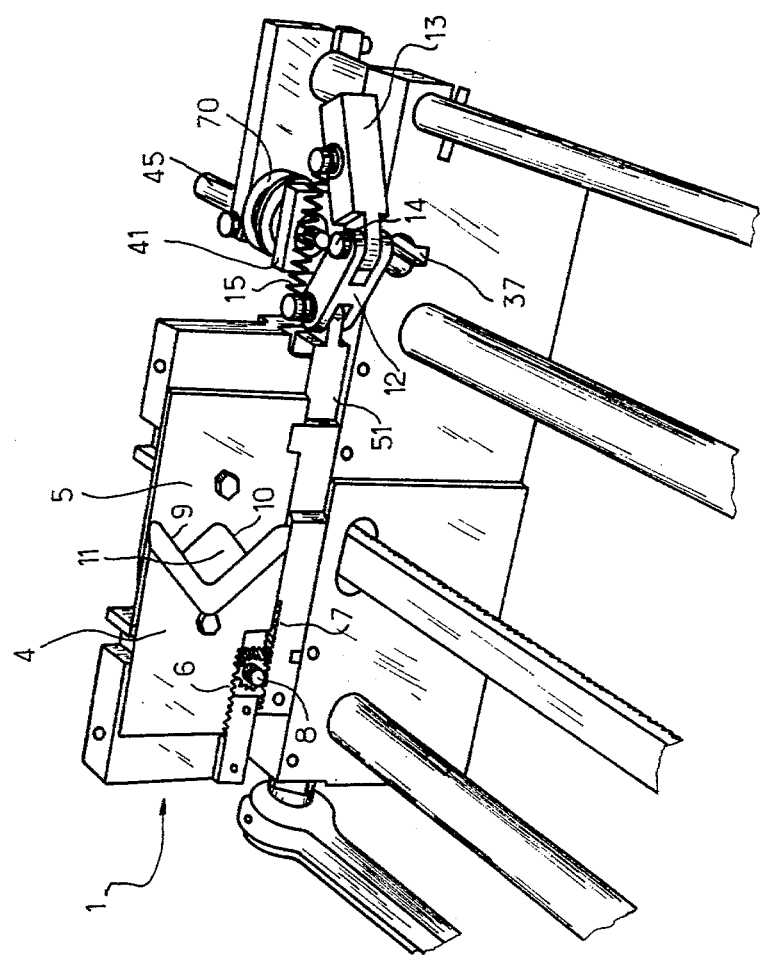
FIG. 2 is a perspective view of the cutting unit of the apparatus shown on FIG. 1, the knives being shown in the introduction position.
Figure 3:
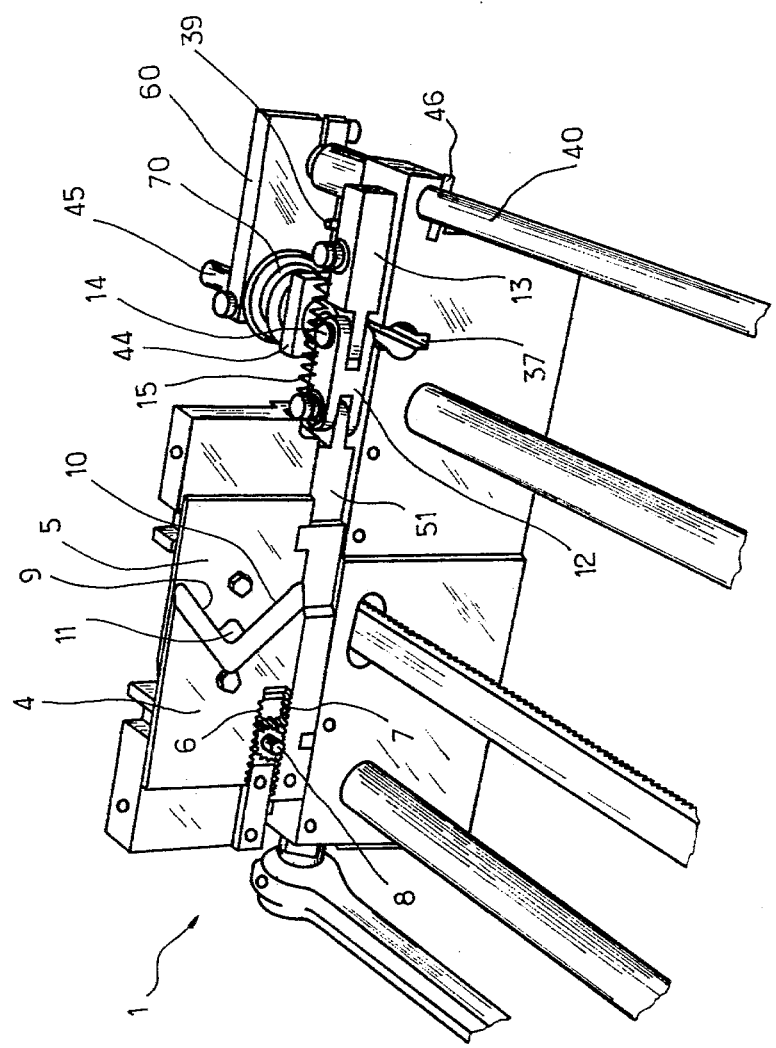
FIG. 3 is a view similar to that of FIG. 2, with the knives shown in cutting position.

For stripping an electric wire or an electric cable, the clamping block is first brought against the cutting block 1, the knuckle 14 being then in the position shown on FIG. 2, wherein the minimum radial spacing between the edges 10 and 11 of knives 4 and 5 in the introduction position is greater than the outer diameter of the sheath to be removed, whereas the knuckle 20 of the clamping jaws actuating device, in its open position, presents the configuration shown on FIG. 1. Thereafter, the wire or cable is introduced into the passage 11 defined between the edges of knives 4 and 5 in their introduction position, the portion of wire or cable the sheath of which is to be preserved being placed between the clamping jaws 16 and 17. By conveniently actuating the crank 26, the guiding fork 27 is brought against the face 32 of the carriage 18, against the biasing force of the spring 31, whereby the ends of the stirrup 28 are caused to swing in the direction of the face 32 of the carriage 18, which results in a movement in the same direction of the actuating rod 40 urged by the roller 33. The longitudinal movement of said rod 34, the end 53 of which opposite to the end urged by the roller 33 is engaged in a bore 37 of the knife support 3 causes, through actuating pins 35 and 36, the knuckles 20 and 14 to move along the displacement direction of the actuating rod 34, whereby the clamping jaws 16 and 17 are applied against the wire or cable portion, the sheath of which is to be preserved, the knives 4 and 5 being brought in their cutting position shown on FIG. 3 wherein the minimum radial spacing of edges 9 and 10 is substantially equal to the inner diameter of the sheath to be removed, the connecting rod 12 and the lever 13 being then in mutual alignment.

A further displacement of the actuating rod 34 in the same direction, causes the knuckle 20 to pass very lightly beyond its aligned position with the rotation axis of the connecting rod 19 on the slider 52 and of the lever 21 on the carriage 18. This new position is maintained by means of spring 22 as defined by the position of the stop pin 38, whereas the knuckle 14 also passes beyond its alignment point with the rotation axis of the connecting rod 12 and the slider 51 and of the lever 13 on the knife support 3. The final position, which is more precisely shown on FIG. 1, corresponds to the withdrawing position of knives 4 and 5, wherein the minimum spacing between the edges 9 and 10 is greater than the inner diameter of the insulating sheath, but smaller than the outer diameter thereof. This position of the knuckle 14 is defined by the position of the adjustable stop 44 and is maintained by the spring 15. Then, the clamping block 2 is spaced away from the cutting block 1 by actuating the crank 26 in the opposite direction, the clamping jaws 16 and 17, as also the knives 4 and 5, being retained in their respective positions by the springs 22 and 15, respectively. This movement causes the longitudinal removal of the sheath portion maintained by the cutting edges of the knives 4 and 5 in their withdrawing position.

When the carriage 18 abuts against the restraining block 42 of the control rod 40, the protruding portion 43 of said block 42 causes the lever 21 to rotate, the knuckle 20 to move and the clamping jaws 16 and 17 to move aside; furthermore, the control rod 40 is further drawn by the carriage 18, whereby the knives 4 and 5 are caused to return to their introduction position, the restraining rod 45 bringing the knuckle 14 back towards the clamping block 2. The stripped wire or cable is then released from the clamping jaws 16 and 17 and can be withdrawn from the passage 11. Then, one only has to bring the clamping block 2 against the cutting block 1 by means of the crank 26 to prepare the apparatus for a further stripping operation.

Figure 4:
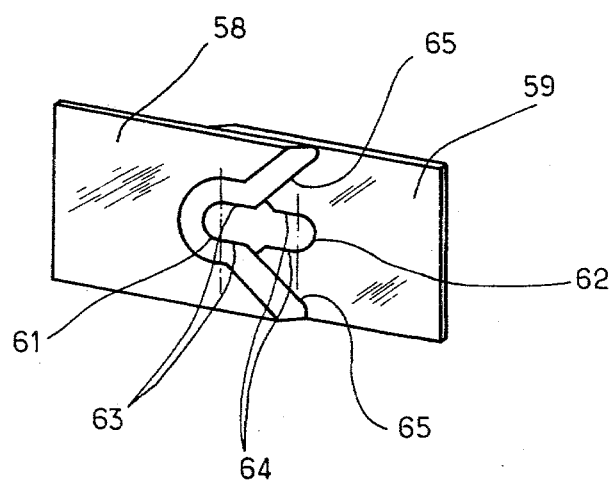
FIG. 4 is a perspective view of a pair of knives provided with semi-circular edges for use with the apparatus of the present invention.

The apparatus of the present invention has been described with reference to V-shaped cutting knives, the edges of which extend at right angles and are opposed in such a way to completely cut the sheath in four points. The method according to the present invention however allows to use circular shaped knives which completely cut the sheath to be removed along the whole periphery thereof. This is specially efficient for critical stripping operations, for example for stripping co-axial cables, conductors with a very thin insulating sheath, very short portions to be stripped or for stripping sheathed tubes. FIG. 4 is a perspective view of a pair of circular cutting knives 58 and 59, the semi-circular edges 61 and 62 of which are shaped to correspond exactly to the diameter of the core of the cable to be stripped. Parallel sections 63 and 64 of the edges which prolongate the semi-circular edges in the movement direction of the knife allow a perfectly circular cutting on the whole periphery of the core, whereas sections 65, sloped at right angle towards the end of the knife, provide an easy centering of the conductor before it is cut. In this case, it is of course necessary to have a pair of knives for each core diameter of the cable to be stripped.

It will be easily understood that the stripping apparatus of the present invention has been disclosed with reference to a preferred embodiment, but it is not limited thereto. Instead, modifications will appear to those skilled in the art while remaining within the spirit and the scope of the present invention as defined by the appended claims.

For example, actuation of the knives and of the clamping means may be obtained with convenient mechanic or hydraulic devices adapted to maintain the knives in withdrawing position during the relative spacing movement of the clamping means and of the knives.

What is claimed is:

1. An apparatus for stripping an electric wire comprising a conductor covered by an insulating sheath or an electric cable constituted by a plurality of electric wires included within a common insulating sheath, which comprises:

two movable knives, the facing cutting edges of which define a passage for the wire or the cable, said knives movable in a substantially radial direction and in the plane of said passage between an introduction position wherein the minimum radial spacing between said edges is greater than the outer diameter of said insulating sheath and a cutting position wherein said minimum radial spacing is substantially equal to the inner diameter of said insulating sheath;

clamping means provided in prolongation of said passage for receiving a wire or cable portion the insulating sheath of which is to be preserved;

means for actuating said movable knives between said introduction position and said cutting position; and means for applying the clamping means onto the wire portion they receive and for bringing same longitudinally along a direction perpendicular to said plane of the passage for relatively spacing and bringing together said clamping means and said knives;

further comprising means for bringing the knives in a withdrawing position wherein the minimum radial spacing of the knife edges is greater than the inner diameter of the insulating sheath, but smaller than the outer diameter, and maintaining same in said position during at least the beginning of the relative spacing movement of said clamping means and of said knives.

2. An apparatus according to claim 1, comprising two movable knives mounted for inverted sliding movement on a knife support and two movable jaws mounted for inverted sliding movement on a longitudinally movable carriage, said knives and clamping jaws being each actuated by a knuckle device comprising a connecting rod and a lever, the knuckle axes of which may be longitudinal displaced and actuated by an actuating rod slidingly mounted on the carriage, further comprising a longitudinally extending rack which is adapted for meshing engagement with a pinion mounted on said knife support and freely passes through said carriage, said rack having one end protruding from said carriage for cooperation with a swinging device pivotingly supported on said carriage, said swinging device urging said actuating rod against the biasing force of resilient means.

3. An apparatus according to claim 2, wherein said swinging device is a U-shaped stirrup mounted on said carriage for rotation about the longitudinal axis of the base of the U of said stirrup, the end of the first stirrup arm being urged by said end of said rack protruding from said carriage, the end of the second arm of said stirrup urging said actuating rod.

4. An apparatus according to claim 3, wherein said end of said first stirrup arm supports a guiding fork rigidly mounted on the crank, said end of said second stirrup arm receiving a roller which urges said actuating rod, said elastic means comprising a spring mounted between said fork and said carriage.

5. An apparatus according to claim 4, wherein displacement of said actuating rod in the direction towards said knife support displaces said knuckle which actuates said knives from a first angular offset position of a connecting rod and of a lever constituting said knuckle, which position corresponds to said introduction position of the knives, to an aligned position of said elements constituting said knuckle which corresponds to said cutting position of said knives, and then, beyond said aligned position, to a second angular offset position of said elements which corresponds to said withdrawing position of said knives.

6. An apparatus according to claim 5, wherein said second angular offset position is maintained by a spring stretched between said connecting rod and said lever constituting the knife actuating knuckle.

7. An apparatus according to claim 6, further comprising a restraining rod for bringing the knife actuating knuckle from said second angular offset position back to said first angular offset position whereas said movable carriage reaches an end position away from said knife support.

8. An apparatus according to claim 7, wherein said restraining rod is rigidly mounted at one end of a longitudinally extending bar which is slidingly mounted in said knife support, the other end of said bar supporting an adjustable thrust block against which said carriage abuts when it reaches its said end position away from said knife support.

9. An apparatus according to claim 8, wherein said bar is urged by a spring so as to move said thrust block towards said knife support, said movement being limited by a stop pin rigidly mounted on said bar adjacent said knife support.

10. An apparatus according to claim 9, wherein said thrust block comprises a protruding portion onto which abuts said lever of said clamping jaws actuating knuckle when said carriage has reached its said end position away from said knife support, whereby causing opening of said clamping jaws.

11. An apparatus according to claim 1, wherein said knives are each provided with a semi-circular cutting edge prolongated in the movement direction of said knife by parallel edge portions in turn prolongated by end edges sloped at right angle towards the side edge of said knife.

12. An apparatus according to claim 5, wherein said knives are each provided with a semi-circular cutting edge prolongated in the movement direction of said knife by parallel edge portions in turn prolongated by end edges sloped at right angle towards the side edge of said knife.

* * * * *